United States Patent [19]

Chunduru et al.

[11] Patent Number: 5,740,124
[45] Date of Patent: Apr. 14, 1998

[54] METHOD FOR DETERMINING ACOUSTIC VELOCITY OF EARTH FORMATIONS BY SIMULATING RECEIVER WAVEFORMS FOR AN ACOUSTIC ARRAY WELL LOGGING INSTRUMENT

[75] Inventors: Raghu K. Chunduru, Houston; Xiaoming Tang, Sugar Land, both of Tex.

[73] Assignee: Western Atlas International, Inc., Houston, Tex.

[21] Appl. No.: 752,327

[22] Filed: Nov. 19, 1996

[51] Int. Cl.$^6$ ............................ G01V 1/40; G01V 1/36
[52] U.S. Cl. ............................ 367/73; 367/25; 367/32
[58] Field of Search ............................ 367/25, 73, 32, 367/38; 364/422

[56] References Cited

U.S. PATENT DOCUMENTS

| | | | |
|---|---|---|---|
| 4,698,793 | 10/1987 | Wu | 367/32 |
| 5,197,038 | 3/1993 | Chang et al. | 367/28 |
| 5,541,890 | 7/1996 | Tang | 367/34 |
| 5,570,321 | 10/1996 | Bernitsas | 367/38 |

OTHER PUBLICATIONS

Landa et al, "Reference velocity model estimation from prestack waveforms: Coherency optimization by simulated annealing", Geophysics, V.54, #8, pp. 984–990, Aug. 1989.

*Primary Examiner*—Ian J. Lobo
*Attorney, Agent, or Firm*—Richard A. Fagin

[57] ABSTRACT

A method of determining the acoustic propagation velocities of earth formations using signals generated by an acoustic array well logging instrument. The method includes generating a model of the acoustic velocities including a value of velocity for each propagation mode for which the velocity is to be determined Acoustic waveforms are synthesized for a plurality of receiver locations on the acoustic logging instrument by using the values of the acoustic velocities in the model. A difference is determined between the synthesized waveforms and measured waveforms generated by acoustic energy detected at corresponding receiver locations on the acoustic logging instrument. The model is adjusted and the waveforms are resynthesized until the difference is determined to be at a minimum. The step of adjusting the model is performed by very fast simulated annealing.

5 Claims, 5 Drawing Sheets

METHOD FOR DETERMINING ACOUSTIC VELOCITY OF EARTH FORMATIONS BY SIMULATING RECEIVER WAVEFORMS FOR AN ACOUSTIC ARRAY WELL LOGGING INSTRUMENT

BACKGROUND OF THE INVENTION

1. Field of the Invention

The invention is related to the field of acoustic wellbore logging. More specifically, the invention is related to methods of processing receiver signals from an acoustic array wellbore logging instrument in order to determine acoustic energy transmission properties of earth formations penetrated by a wellbore.

2. Description of the Related Art

Acoustic array wellbore logging instruments are used for determining acoustic energy transmission properties, particularly the acoustic velocity, of earth formations penetrated by wellbores. The array acoustic wellbore logging tools known in the art typically include an energy emitting transducer, called a transmitter, and a plurality of receiving transducers, called receivers, axially spaced apart from the transmitter along an elongated instrument mandrel. The transmitter periodically energizes the wellbore with pulses of acoustic energy. The acoustic energy travels through a fluid filling the wellbore and interacts with the interface between the fluid and the wall of the wellbore. Some of the acoustic energy can then travel along the wellbore wall. After travelling along the wellbore wall, some of the energy can travel back into the wellbore towards the instrument where it can be detected by the receivers. The receivers convert the acoustic energy into electrical signals having amplitudes corresponding to the acoustic energy amplitude.

Acoustic logging instruments known in the art typically include circuits in an electronics unit disposed within the instrument mandrel which digitize the receiver signals, and other circuits to transmit the digitized signals along the electrical cable to processing and recording equipment located at the earth's surface. The properties of interest of various earth formations traversed by the logging instrument can be determined by performing various calculations on the digitized signals.

For example, a method which is known in the art for determining acoustic transmission velocity of the formation, called semblance correlation, comprises determining values of time difference between the signals from each of the receivers at which the degree of correspondence between the signals reaches a maximum. This time difference is then used to calculate a formation acoustic velocity based on the distances between the receivers being known.

Other methods known in the art for determining formation velocity from the receiver signals include so-called N-th root stacking, which includes digitally summing or stacking predetermined portions of the receiver signals in order to improve the signal-to-noise ratio of the velocity determinations.

The drawbacks to acoustic velocity determination by semblance correlation and N-th root stacking are particularly described in U.S. Pat. No. 5,541,890 issued to Tang. These drawbacks include the fact that the receivers can be responsive to more than one mode of acoustic energy propagation. Propagation modes are related to the manner in which the particles of the formation move relative to the direction of propagation of the acoustic energy and can include so-called compressional mode, shear (or flexural) mode and Stoneley modes. Certain acoustic energy propagation modes can have significant overlap in time of arrival the receivers, making isolation of the desired propagation mode difficult using N-th root stacking or semblance correlation.

It is also known in the art to distinguish one propagation mode from another by filtering the receiver signals with a frequency bandpass filter having a passband corresponding to the frequency content of the desired propagation mode. A limitation to bandpass filtering is that the desired propagation mode may have significant overlap in frequency content with other propagation modes, making difficult the isolation of the desired mode, and subsequent determination of the velocity of that propagation mode. For example, shear propagation mode, in which the acoustic energy propagates substantially perpendicularly to the direction of particle motion, can have different acoustic velocities for different orientations of particle motion in some anisotropic earth formations. A single acoustic signal comprising the two different orientations of shear waves, representing shear propagation at two different velocities, would be difficult to separate into its component modes using bandpass filtering and semblance correlation for determining acoustic velocity, since the frequency content and time span of the two modes would have substantial overlap.

The method for acoustic signal processing described in the Tang U.S. Pat. No. 5,541,890 provides a solution to the limitations of the methods known in the art for determining acoustic velocity of earth formations. The method described in the Tang U.S. Pat. No. 5,541,890, however, can be unsuitable for automatic processing of acoustic well log instrument signals. The speed and accuracy of the result of the method described in the Tang U.S. Pat. No. 5,541,890 depend on having selected initial values of velocities of earth formations which are fairly close to the actual values of velocity. The amount of time taken, and the accuracy of the result in determining velocities from the acoustic signals using the method in the Tang U.S. Pat. No. 5,541,890 is related to the manner in which the minimum value of an objective function is determined. The method described in the Tang U.S. Pat. No. 5,541,890, therefore, is generally limited to processing the signals, and determining velocities, after the acoustic well logging instrument is withdrawn from the wellbore. In certain instances it may be advantageous to be able to determine the acoustic velocity of the earth formations while the instrument is disposed in the well bore and generating the acoustic signals required for processing, often referred to as in "real time".

SUMMARY OF THE INVENTION

The invention is a method for determining the acoustic propagation velocities of earth formations using signals generated by an acoustic array well logging instrument. The method includes generating a model of the acoustic velocities, including a value of velocity for each propagation mode for which the acoustic velocity is to be determined. Acoustic waveforms are synthesized for a plurality of receiver locations on the acoustic logging instrument using the values of the acoustic velocities in the model. A difference is determined between the synthesized waveforms and measured waveforms generated by acoustic energy detected at corresponding receiver locations on the acoustic logging instrument. The model is adjusted, and the waveforms are resynthesized, until the difference is determined to be at a minimum. The step of adjusting the model is performed by very fast simulated annealing. In the preferred embodiment, the simulated annealing process can be stopped when thirty successive models generated by the simulated annealing process, have a value of the difference, or error function, between the measured waveforms and the synthesized waveforms different from the error function of the previous model by an amount of less than 0.01.

In a particular embodiment of the invention, the model is first generated by selecting values at random from a range of possible values of velocity of earth formations for each possible propagation mode. In the particular embodiment of the invention, the waveforms measured by the receivers on the acoustic well logging instrument can be divided into time windows. Each time window can contain energy from particular propagation modes. The process of selecting the model, synthesizing the waveforms and adjusting the model can be performed for the propagation modes present in each window so as to minimize the computation time.

DESCRIPTION OF THE PREFERRED EMBODIMENT

Figure 1:
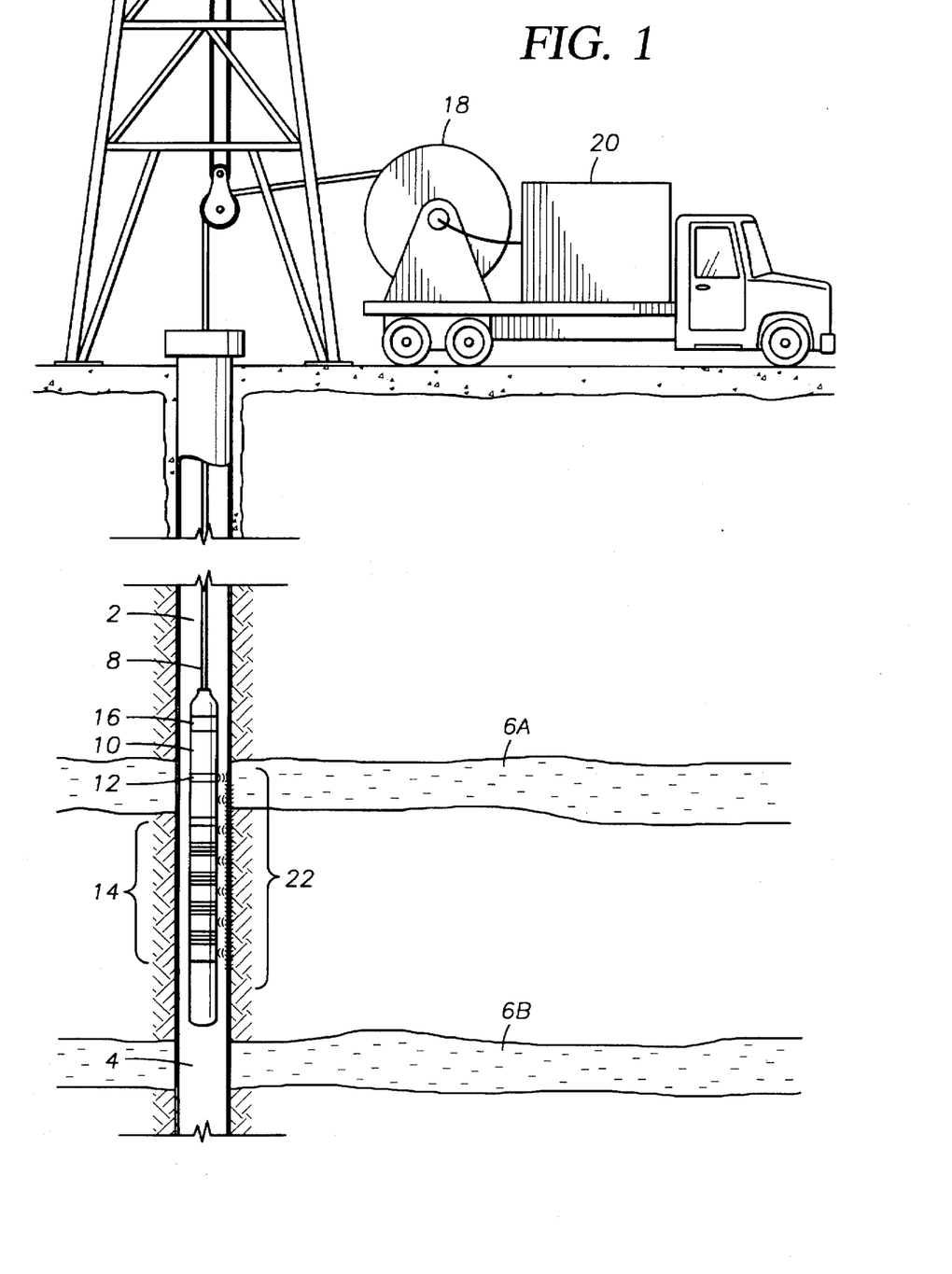
FIG. 1 shows an array acoustic wellbore logging instrument disposed in a wellbore.

The invention can be better understood by referring first to FIG. 1. An acoustic array wellbore logging instrument 10 is shown attached to one end of an armored electrical cable 8. The cable 8 can be extended into and withdrawn from a wellbore 2 penetrating earth formations, shown generally as 6A and 6B. A winch 18, or similar device known in the art can be used to extend the cable 8 into and withdraw it from the wellbore 2. The wellbore 2 is typically filled with a liquid 4 which can be "drilling mud", or a similar fluid known in the art. The liquid 4 enables transmission of acoustic energy from the instrument 10 outwardly to the wall of the wellbore 2.

As the instrument 10 traverses the wellbore 2, an energy emitting acoustic transducer disposed on the instrument 10, called a transmitter and shown generally at 12, periodically emits acoustic energy pulses. The pulses are shown generally as 22. The pulses 22 travel outwardly from the transmitter 12 through the fluid 4 in the wellbore 2, until they contact the wall of the wellbore 2. The pulses 22 then typically travel along the wellbore 4 wall. Some of the acoustic energy returns to the fluid 4 in the wellbore 2 and can be detected by a plurality of receiving transducers disposed at axially spaced apart locations from the transmitter 12, the receiving transducers being called receivers and shown generally at 14. The receivers 14 generate electrical signals corresponding to the amplitude of the acoustic energy reaching the receivers 14.

The logging instrument 10 typically includes signal processing electronics, shown generally at 16, which can digitize the signals from the receivers 14 and then impart the digitized signals to the cable 8 in an appropriate telemetry format. The signals imparted to the cable 8 can be transmitted to a surface electronics unit 20. The surface electronics unit 20 can include a computer (not shown separately for clarity) which can perform signal processing according to the present invention. Alternatively, the surface electronics 20 can generate a recording of the digitized signals. The recording can be processed later in another computer (not shown) according to the method of the present invention, which will be further explained.

It is to be understood that the method of signal processing according to the invention is not limited to being performed at any specific physical location. The choice of location for the computer (not shown) which performs the method of the invention is only a matter of convenience for the system operator. For example, another computer (not shown) can be adapted to form part of the signal processing electronics 16 disposed within the logging instrument 10 so that the method of the invention could be performed within the instrument 10 itself.

Figure 2A:
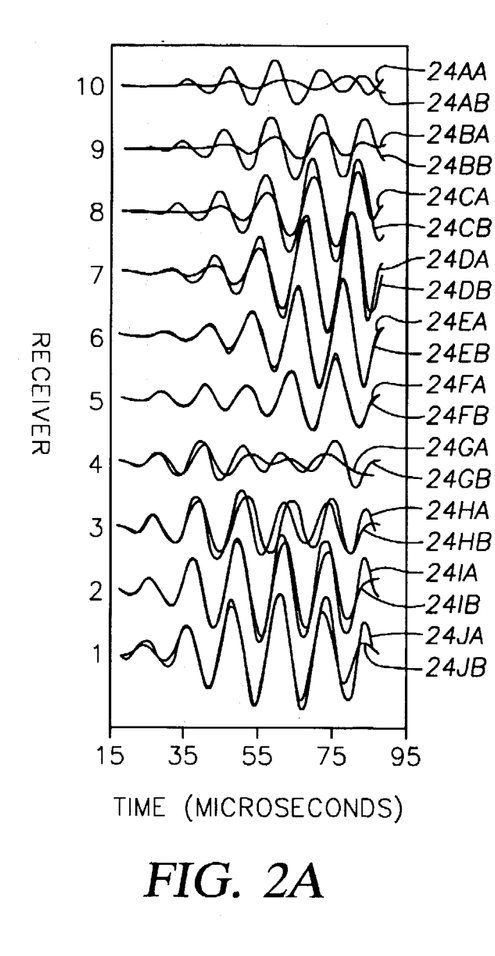
FIGS. 2a, 2b and 2c show graphic representations of measured signals from receivers on the instrument in FIG. 1 compared with waveforms synthesized according to the invention.

The first part of the method of signal processing according to the invention is described in U.S. Pat. No. 5,541,890 issued to Tang, incorporated herein by reference. The graph in FIG. 2a is a representation of receiver signals, shown generally at 24AA through 24JA, for ten individual receivers (such as those shown at 14 in FIG. 1) which are primarily responsive to acoustic energy in a so-called "dipole flexural" propagation mode. Receivers which are responsive primarily to acoustic energy propagating in flexural mode, called dipole receivers, are known in the art and are described, for example, in "Multipole Array Acoustilog", Western Atlas Logging Services, Houston Tex., 1994.

Figure 2B:
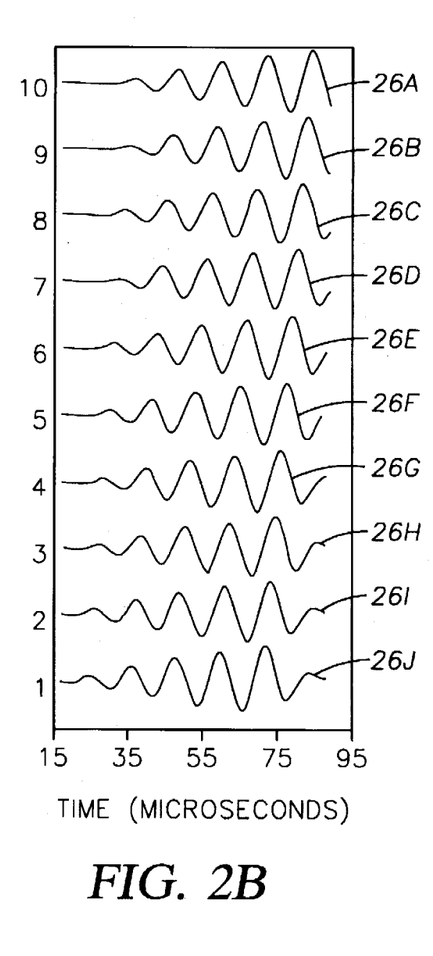
Figure 2C:
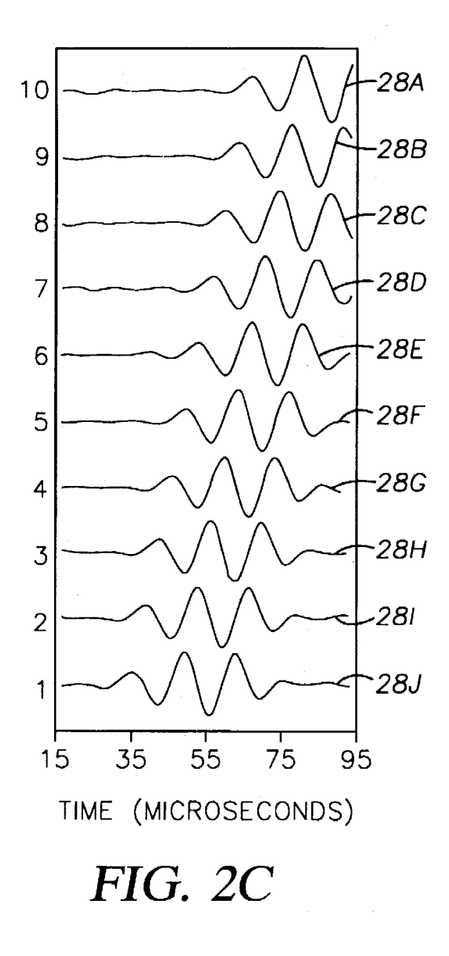

The signal representations shown at 24AA through 24AJ in FIG. 2a are for signals generated in a laboratory test fixture (not shown) including a dipole transmitter and dipole receivers. The receivers in the laboratory fixture (not shown) used to generate the signals shown graphically in FIGS. 2a, 2b and 2c are axially spaced apart from each other by a distance of 0.5 centimeters. As will be further explained, FIG. 2a further includes representations of synthesized receiver signals, shown generally at 24BA through 24BJ, the syntheses having been performed by the method described in the Tang U.S. Pat. No. 5,541,890.

The signals shown at 24AA through 24JA in FIG. 2a can be composed of two differently propagating modes of acoustic energy, which modes can be observed separately by referring to FIGS. 2b and 2c. FIG. 2b represents signals generated by acoustic energy propagating in the flexural mode, shown as 26A through 26J for each of the same receivers whose composite signals are shown in FIG. 2a. The signals in FIG. 2 were generated in the same laboratory test fixture (not shown) as the signals in FIG. 2a. As is understood by those skilled in the art, acoustic energy propagating in the flexural mode typically propagates substantially at the shear velocity of the earth formation (shown as 4 in FIG. 1).

FIG. 2c shows graphic representations, shown generally at 28A through 28J, of signals propagating as a so-called "tube" wave. The tube wave signals 28A through 28J were generated in the same laboratory fixture (not shown) as the signals represented in graph (b). Tube waves propagate substantially at the compressional velocity of the fluid (shown as 4 in FIG. 1) in the wellbore (shown in FIG. 1 as 2), and as is understood by those skilled in the art, are typically present in wellbores in which a pipe or casing (not shown) has been coaxially inserted. Tube waves can also be induced by a transmitter (not shown in FIG. 2) which has non-flexural energy components, including compressional energy components, in its output. The signals shown in FIG. 2a as 24AA through 24AJ represent composite signals generated by combination of both modes, tube waves and flexural mode waves, of acoustic energy propagation which are shown separately in FIGS. 2b and 2c.

As can be observed by referring to FIGS. 2b and 2c, a velocity can be readily calculated when only one propagation mode is present in the signals by determining a time delay between corresponding signals at each receiver and dividing the time delay into the distance between the receivers, for example by using a method known in the art such as semblance correlation. The time delay between received signals is readily apparent by visual observation of signals such as 26A through 26J in FIG. 2b, as it is also apparent between signals such as 28A through 28J in FIG. 2c. Combination of two different propagation modes as represented by signals 24AA through 24AJ in FIG. 2a shows that a plurality of modes in the signals can cause interference which obscures the time delay apparent in the individual mode signals shown in FIGS. 2b and 2c.

As described in the Tang U.S. Pat. No. 5,541,890 the velocity determination method is related to the fact that the received, or measured, signal generated at each individual receiver (such as those shown at 14 in FIG. 1) in response to the acoustic energy, can be synthesized from a combination of measured signals from other receivers 14 on the instrument (shown as 10 in FIG. 1). In the description of this embodiment of the invention, the measured signals from the other receivers 14 can include a quantity, designated by the variable p, of different acoustic energy propagation modes. The logging instrument (shown in FIG. 1 as 10) can include a number of receivers, the number designated by the variable N. It is to be understood that the number of receivers 14 on the instrument 10 is not a limitation of the present invention. The number of receivers 14 on the instrument 10 needed to practice the method of the present invention need only be at least one greater than the number of propagation modes (p) present in the signals for which velocities are to be determined, as will be further explained.

As is understood by those skilled in the art, the signal actually measured by any particular receiver 14, that particular receiver 14 indicated by an index number n (where n is a number indicating the ordinal position of the particular receiver and is therefore in the range from 1 to N, N being the previously described total number of receivers 14 on the instrument 10), the measured signal designated by the variable $W_n(\omega)$, can be synthesized by a combination of measured signals from other receivers 14 according to the following expression:

$$\overline{W}_N(\omega) = -\sum_{m=1}^{p} a_m(\omega) W_{(n-m)}(\omega) \qquad (1)$$

where $\omega$ in equation (1) represents the angular frequency. The overbar designation above the $W_n(\omega)$ expression in equation (1) indicates that particular signal is a synthesized signal. The (n–m) subscript in equation (1) represents the individual receiver 14 having an ordinal position, or index number, equal to (n–m), which individual receiver 14 is the one spaced apart from the n receiver 14 by m receiver locations along the logging instrument 10. Equation (1) further indicates that the measured signal at the n receiver must be synthesized by combining measured signals from a quantity of other measured signals from different receivers 14 at least equal in number to the number of propagation modes p in the synthesis. For example, if the synthesis were to include shear and compressional modes, then measured signals from at least two other receivers 14 would need to be combined in order to synthesize the signal at the instant, or n, receiver 14.

The a coefficients of equation (1) are related to a characteristic equation, known to those skilled in the art, which determines the relative contribution of each of the propagation modes in the synthesized signal, the characteristic equation being:

$$z^p + \alpha_1 z^{p-1} + \ldots + \alpha_{p-1} z + \alpha_p = 0 \qquad (2)$$

where $z = e^{i\omega s d}$ and i represents the square root of $-1$. s in equation (2) represents the inverse of acoustic velocity, hereinafter called "slowness", and d in equation (2) represents the axial spacing between the receivers 14 used to synthesize the signal at the instant receiver 14. In the present embodiment of the invention, all possible values of d consistent with the actual axial spacing of the receivers 14 on the instrument 10 can be used in order to provide a high quality determination of the slowness corresponding to each propagation mode. In the acoustic logging instrument 10 of the invention, the receivers 14 can be axially spaced apart from each other by a distance of 0.5 feet. The axial spacing between receivers 14 is selected only as an example and is not meant to limit the invention. The axial spacing only need be known in order to use the method of the invention.

In the invention, the a coefficients can be expressed in terms of the p-roots of equation (2) as shown by the expressions:

$$a_1 = -\sum_{k=1}^{p} z_k \qquad (3)$$

and on through the p-th expression:

$$a_2 = \sum_{k,j=1}^{p} z_k z_j, (k<j) \qquad (4)$$

$$a_3 = -\sum_{k,j,m=1}^{p} z_k z_j z_m, (k<j<m) \qquad (5)$$

By substituting the a coefficients calculated according to the preceding expressions into equation (1), it is then possible to synthesize the signals in the time domain, rather than in the frequency domain as suggested by equations (1) and (2). Time domain synthesis can be performed by choosing various values of slowness s for each one of the p propagation modes that are to be included in the synthesized signal. An expression for a time domain synthetic signal at the n-th receiver is:

$$\overline{W}_n(t) = \sum_{k=1}^{p} W_{n-1}(t - s_k d) - \sum_{k,j=1}^{p} W_{n-2}[t - (s_k + s_j)d] + \qquad (7)$$
$$\sum_{k,j,m=1}^{p} W_{n-3}[t - (s_k + s_j + s_m)d] + \ldots -$$
$$(-1)^p W_{n-p}\left(t - \sum_{k=1}^{p} s_k d\right), (k<j<m)$$

where $s_k$, $s_j$, $s_m$, represent slowness values for each of the propagation modes included in the signal synthesis.

It is possible to synthesize signals, using as a basis the measured signals from receivers located in either axial direction along the instrument 10 from the instant receiver 14, by changing the sign of the time delay values calculated according to the products of slowness ($s_k$, $s_j$, $s_m$) and receiver spacing d in equation (7).

In this embodiment of the invention, the process of synthesizing signals and comparing the synthesized signals with the measured signals can be repeated for each receiver 14 on the instrument 10. The differences between the synthesized signals and the measured signals for each receiver can be "summed" or "stacked" by methods known in the art in order to improve the reliability of the slowness determination.

The stacked differences between the synthesized signal the measured signal of the instant receiver can then be used to perform an inversion by which the slowness s can be estimated. The estimation of slowness can begin by generating an objective function. Objective functions are known in the art, and one version such an objective function can be calculated by the following expression:

$$E(s_1, s_2, \ldots s_p) = \sum_n \sum_t \|W_n(t) - \overline{W}_n(t, s_1, s_2, \ldots s_p)\| \quad (8)$$

Values of slowness s for each different propagation mode can be substituted into the expression for time domain synthesis of the signal. Initial values of slowness for each propagation mode in the synthesized signal, as will be further explained, can be selected at random from a range of values known to exist in typical earth formations (shown as 6A and 6B in FIG. 1) as is understood by those skilled in the art.

After the signal for a particular receiver is synthesized, the synthesized signal is compared with the measured signal from that same receiver and the value of the objective function is calculated. As explained in the Tang U.S. Pat. No. 5,541,890, measured signals can be compared with synthesized signals for all the receivers on the instrument and the results can be summed. The process is repeated by substituting different values for the slowness, and the value of the objective function is again determined. The values of slowness for which the value of the objective function reaches a minimum are determined to be the slownesses for the respective propagation modes in the acoustic signal.

Methods for minimizing the value of the objective function include well known techniques such as the Levenberger-Marquardt algorithm. The invention, however, provides an improved method for determining the values of slowness for which the objective function will reach a minimum, so that the determination of acoustic velocities can be performed while the logging instrument (10 in FIG. 1) is traversing the wellbore (2 in FIG. 1), substantially in "real time". The minimization technique provided by the invention also avoids the drawback of other minimization techniques in which the solution may become "locked" on a local minimum value of the objective function so as to prevent determining the so called "global", or optimum, solution. The global solution represents the values of slowness for which the objective function reaches its lowest overall value.

The improved method of this invention for minimizing the objective function, and thereby determining the values of slowness, is based on numerical modelling of the thermal properties of a liquid mixture which is cooled below its solidification temperature so as to form crystals. The basis for such numerical simulation is described, for example, in N. Metropolis et al, *Equation of State Calculation by Fast Computing Machines*, Journal of Chemical Physics, vol. 21, pp. 1087–1092 (1953). The model described in the Metropolis et al reference was used later by S. Kirkpartick et al as the basis for a method of parameter optimization by minimizing the value of an error (objective) function. See S. Kirkpatrick et al, *Optimization by Simulated Annealing*, Science, vol. 220, pp. 671–680 (1983). An even faster method of optimization based on the work of Kirkpatrick et al is described in L. Ingber, *Very Fast Simulated Reannealing*, Computer Modeling, vol. 12, pp. 967–973. The techniques described by Kirkpatrick and Ingber are generally referred to as "simulated annealing", meaning that the process of annealing of molten metal is the theoretical basis for the parameter optimization method therein. What is apparent from the preceding references is the amount of computational time required to perform the optimization using simulated annealing techniques. The computation time required when using the methods described in the above references would normally prove to be impractical for use in calculating formation slowness while the logging instrument is still in the wellbore (in real time). It has been determined, however, that the simulated annealing methods described in the Kirkpartick and Ingber references can be modified to provide fast enough results so that the methods can in fact be used while the acoustic logging instrument is still in the wellbore.

Figure 4A:
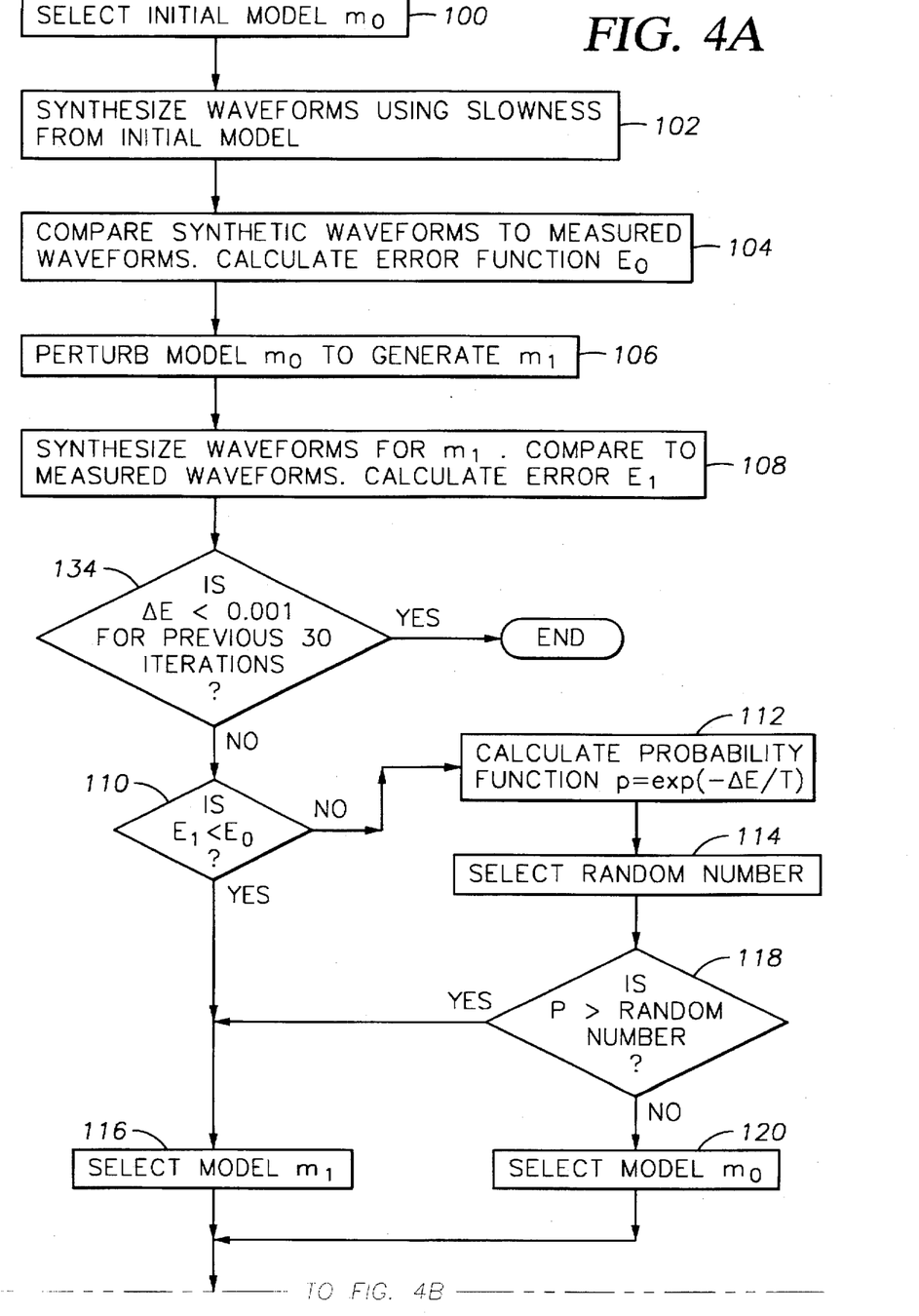
FIGS. 4a and 4b show a flow chart for the process of the invention.

The first step in the optimization according to the invention is to select initial values of each slowness which is to be determined. This is shown in FIG. 4a at 100. Typically the slownesses which are to be determined include compressional, shear, and Stoneley wave slownesses. Initial values for the slownesses, as previously explained, can be selected at random from a predetermined range of slowness values which are known in the art to exist in typical earth formations. A particular advantage of the method of the invention over the prior art is that the speed and accuracy of the result is not dependent on proper selection of the initial values of slowness. Therefore the invention does not require the use of slowness initialization steps, such as threshold detection, to place the initial estimate of slowness as would be required for the velocity determination techniques known in the art. For example, the initial slownesses can be selected using a random number generator, where the random number, rnd, is selected from the range of zero to one. The expression for the initial values of slownesses can be shown as:

$$S_p = (S_p^{max} - S_p^{min}) \times rnd + S_p^{min}$$
$$S_s = (S_s^{max} - S_s^{min}) \times rnd + S_s^{min}$$
$$S_{st} = (S_{st}^{max} - S_{st}^{min}) \times rnd + S_{st}^{min} \quad (9)$$

where $S_p$ represents the compressional slowness, $S_s$ represents the shear slowness, and $S_{st}$ represents the Stoneley wave slowness. The max and min superscripts in equation (9) for each propagation mode represent the maximum and minimum values of slowness in the range of known extant values for these particular wave slownesses.

The values of slowness generated by the random number as shown in equation (9) form an initial model $m_0$ of the slownesses of the earth formation. The values of slowness in the initial model $m_0$ can be used to generate a synthetic waveform (acoustic signal) for selected receiver locations on the acoustic logging instrument according to the time-domain waveform synthesis method described in the Tang U.S. Pat. No. 5,541,890, and reviewed herein. This is shown in FIG. 4a at 102. A difference can be determined for each receiver location between the synthesized waveform at that location, and the waveform of the acoustic signal actually measured by the acoustic logging instrument at the corresponding receiver location. The difference between the synthetic waveform and the waveform actually measured at each receiver location constitutes the so-called "error" (or "objective")function, as shown at 104.

The next step in the method of the invention is to generate a "perturbed" model $m_1$ of the slownesses of the formation, as shown at 106. The perturbed model $m_1$ represents the original model in which each slowness value is changed by a random amount. The random amount, at least initially, can fall within substantially the entire possible range of values of slownesses for each slowness element of the model. As will be further explained, the possible range of slowness values is progressively narrowed as the optimization proceeds. The perturbed model $m_1$ can be generated according to the expression:

$$m_1 = m_0 + y_i(m_{max} - m_{min}) \quad (10)$$

where $y_i$ is a random number falling within a range of possible values in the particular perturbed model which depends on the model "temperature". $y_i$ can be calculated according to the expression:

$$y_i = sgn(rnd - 1/2)T_i \left[ \left(1 + \frac{1}{T_i}\right)^{(2\,rnd-1)} - 1 \right] \quad (11)$$

where $T_i$ represents the "temperature" over which the model is to be tested. As will be further explained, the temperature of the models can be reduced according to a particular "schedule" in order to achieve a global minimum value for the objective function.

After the perturbed model $m_1$ is calculated, new waveforms based on the slowness values in the perturbed model $m_1$ can then be synthesized, as shown at 108. The synthesized waveforms can then be compared with the actual measured waveforms from each corresponding receiver location on the instrument. A new error function $E_1$ can then be generated, as shown at 108, for the synthesized waveforms from the perturbed model $m_1$, just as for the waveforms of the initial model $m_0$. If the new error function $E_1$ from the perturbed model $m_1$ is less than the error function $E_0$ for the initial model $m_0$, as shown in decision box 110, then the perturbed model $m_1$ can be selected for the next step in the process. The pass through from decision box 134 will be explained later. If $E_1$ is greater than $E_0$, a probability function P based on the "temperature" can then be calculated, as shown at 112. The expression for the probability function can be shown as:

$$P = exp(-\Delta E/T) \quad (12)$$

where $\Delta E$ represents the difference between error functions $E_1$ and $E_0$. A new random number between zero and one can then be selected, as shown at 114. Generally the temperature T in equation (12) can be the same as the model temperature $T_i$, but in certain circumstances, such as where the system operator is more confident of some of the model slowness parameters, the temperature in equation (12) may be reduced. If the value of the probability function P is greater than the random number, then the perturbed model $m_1$ can be substituted for the original model $m_0$, as shown in decision box 118 and at 116. If the value of the probability function is less than the random number, then the original model $m_0$ is retained for the next step in the process, as shown at 120. The theoretical basis for the model selection according to the probability function in equation (12) is explained in the Metropolis et al reference, supra.

The next step in the process is to repeat the steps of perturbing the model brought forward from the previous step (either $m_0$ or $m_1$ depending on the selection criteria as previously explained), to generate a second perturbed model $m_2$. Then waveforms can be synthesized based on the slowness values in the second perturbed model $m_2$. An error function for the simulated waveforms of the second perturbed model $m_2$ can be generated by determining the difference between the measured waveforms and the synthetic waveforms for the second perturbed model. The error function associated with the second perturbed model can then be compared to the error function for whichever model is brought forward from the previous step of the process (either $m_1$ or $m_0$ as previously described). If the value of the error function for the second perturbed model is smaller than the error function of the model brought forward, then the second perturbed model can be selected for the next step in the process. If the model brought forward has a smaller error function value, then the model brought forward can be selected.

It has been determined that for purposes of determining the optimum slowness values from the signals received by an acoustic array well logging instrument, that the process as described up to this point need only be performed two times for each "temperature" to provide acceptable results while minimizing the amount of computation time. Prior art methods of simulated reannealing, as described for example in the Ingber and Kirkpatrick et al references, supra, generally recommended a much larger number of perturbations of the original model at each model "temperature" to achieve acceptable results, these perturbations being described in these references by the expression "moves per temperature". Decision box 122 in FIG. 4b shows the process alternatives depending on whether the model selected is the first one or the second one for the particular model temperature.

Figure 4B:
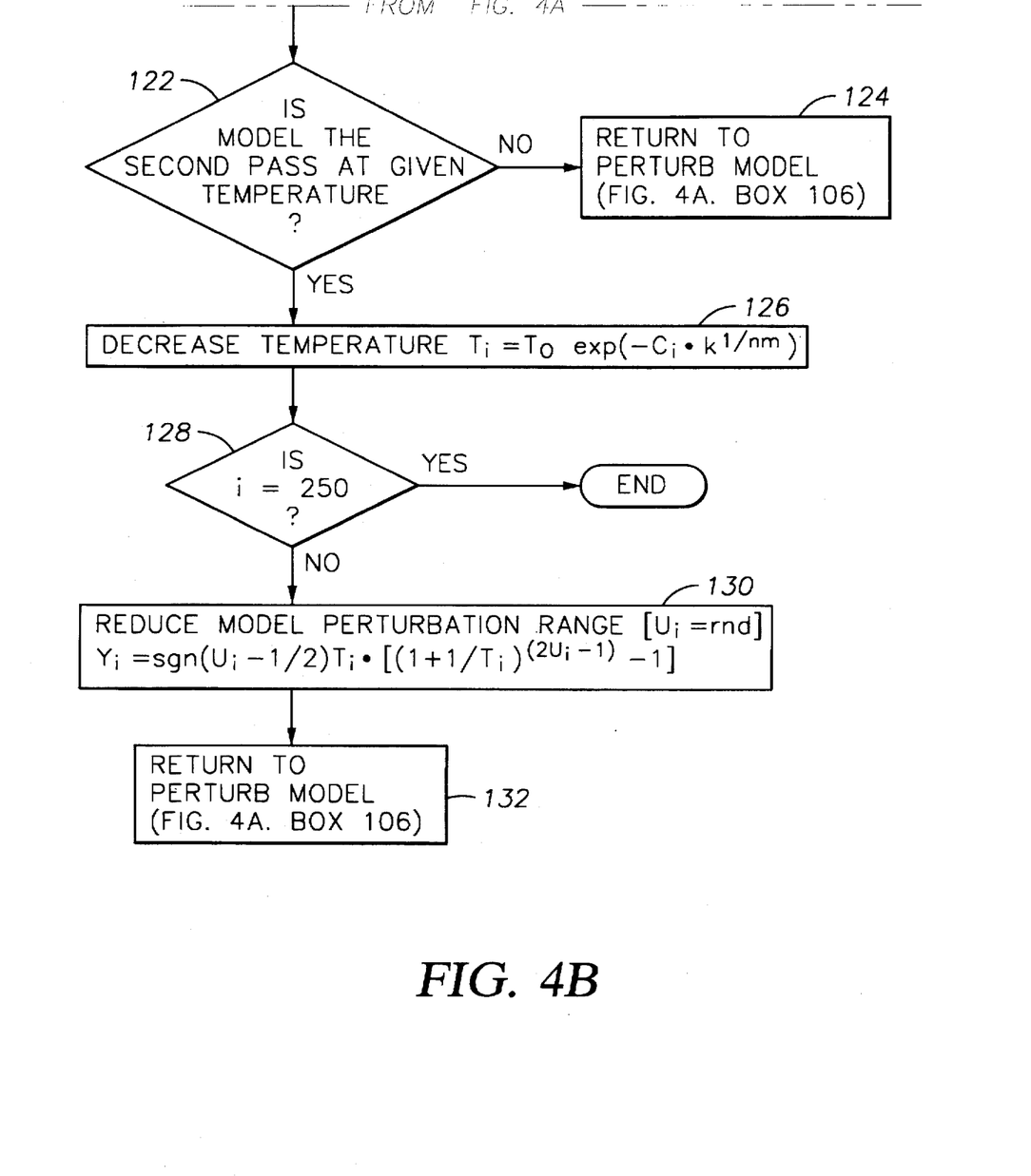

After generating the second model at the particular model temperature, the next step in the process of the invention is to reduce the model temperature, particularly according to a Cauchy-distribution function, shown at 126 in FIG. 4b. Subsequent, reduced model temperatures $T_i$ can be determined from the initial model temperature $T_0$ according to the expression: where $C_i$ represents a temperature decay rate, and k represents the iteration number $$T_i = T_0 exp(-C_i k^{(1/NM)}) \quad (13)$$

in the process of the invention. NM is meant to represent the number of slowness values modeled in the method of the invention (which as described in this example can be three, one each for compressional, shear and Stoneley propagation mode), but it has been determined that the method of the invention will work more efficiently if the value of NM is set to 0.5. It has also been determined by experiment that a value of 0.98 works more efficiently for the value of the decay rate $C_i$.

In the prior art, which was intended to simulate the annealing of substances such as molten metals, much higher initial values for $T_0$ were believed to be necessary. It has been determined by experiment that an initial value of 1 for $T_0$ will provide very accurate results for the values of slowness, and at the same time will substantially reduce the amount of computing required to generate the optimum result.

After the model temperature is reduced, the process can be returned to the step of perturbing the model and comparing error function values with the previous model. It has further been determined that about 250 reductions in model temperature, using two perturbations of the model at each temperature, will usually be enough to provide convergence on the optimum slowness values. This is shown at decision box 128 in FIG. 4b. The significance of each step of reducing the model "temperature" is that the range of slowness values which can be generated by the random number generator according to equation (11) is reduced with each step of reduction in model temperature, as shown at 130. As the temperature is reduced, the slowness values in each subsequently perturbed model rapidly converge on the optimum values. At 132, the process returns to the step (at 106 in FIG. 4a) of perturbing the most recent model generated.

To minimize the amount of computation time in determining the optimum values of slowness, the process can include determining the difference in the value of the error function for each subsequent model accepted by the process.

If the value of the error function for each subsequently accepted model varies from the error function of the previous model by less than 0.01, and this value of difference between is maintained for about thirty sequential models, then the process can be halted and the values for slowness from the last model can be used as the values of slowness for the particular earth formation. This is shown at decision box 134 in FIG. 4a.

DESCRIPTION OF A PARTICULAR EMBODIMENT

The first embodiment of the invention provides a rapid means of determining optimum slowness values for acoustic velocity determination by waveform simulating. This embodiment of the invention provides even greater speed in processing so that the acoustic well logging instrument can be withdrawn from the wellbore at commercially acceptable speeds while simultaneously calculating acoustic velocity of each propagation mode.

Figure 3:
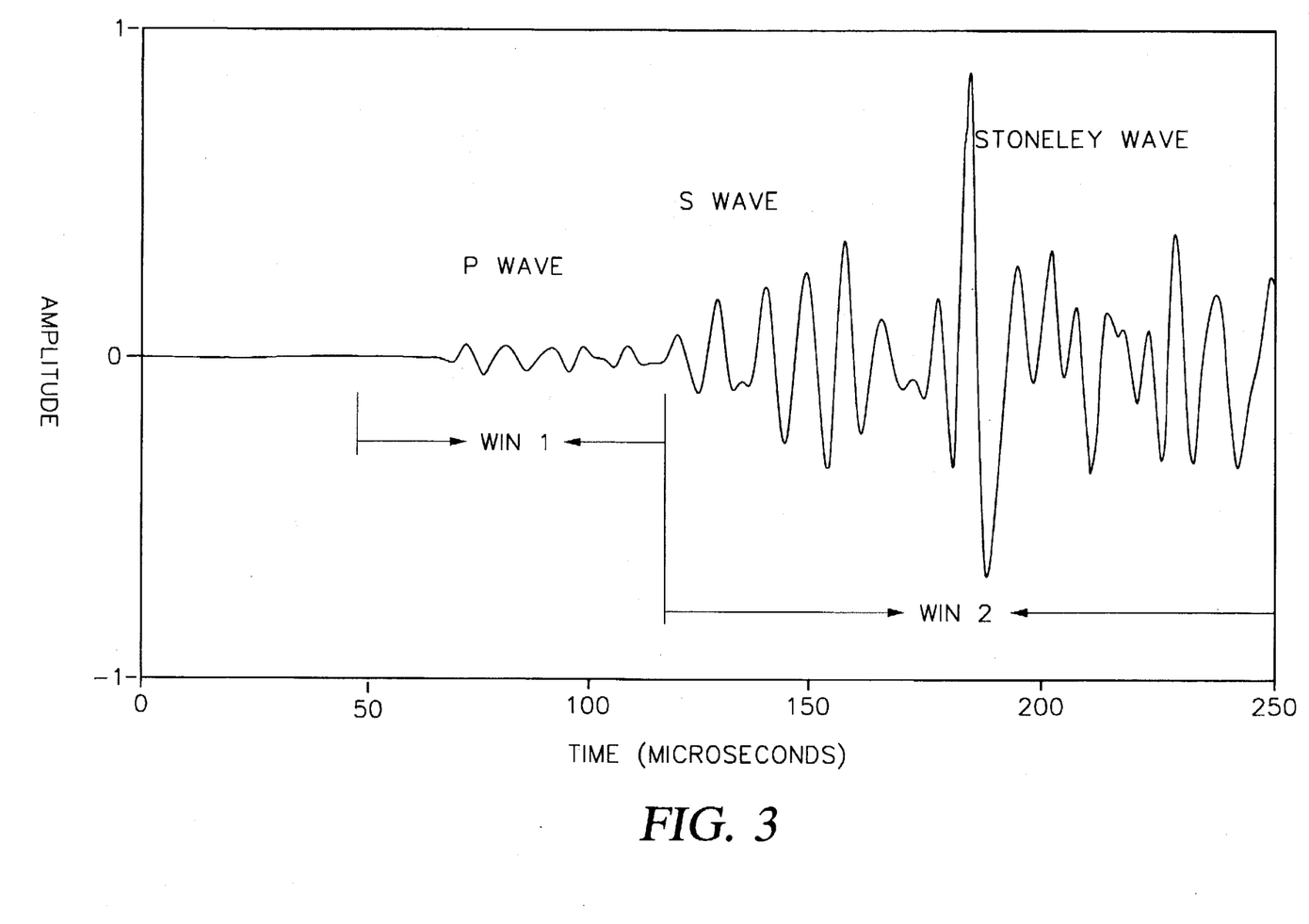
FIG. 3 shows a signal waveform from one of the receivers on the acoustic array instrument to illustrate a "windowing" technique of a particular embodiment of the invention.

FIG. 3 shows a typical waveform of signals from one of the receivers on the acoustic well logging instrument in FIG. 1. As is known in the art, the compressional energy, shown as P wave in FIG. 3 is typically the first to arrive since it travels along the wellbore wall at the greatest velocity (smallest slowness). A first time window, shown at Win 1 can be set to perform waveform simulation using only compressional energy, whereby the model for the waveform within time window Win 1 only includes a value for compressional slowness $S_p$. The process of perturbing the model, comparing error functions of simulated waveforms using the perturbed model against the waveforms synthesized using the original model, and adjusting the temperature can be performed using only the compressional slowness in the models. A second window Win 2 can be set to begin at the termination of window Win 1. The waveform synthesis and model optimization as previously described can then be performed using only shear, or shear and Stoneley wave slownesses in each of the models.

A particular benefit of the embodiment described herein is that it is suitable for parallel processing.

The embodiments of the invention described herein are meant to serve only as an example and are not meant to limit the invention. Those skilled in the art will readily devise extensions and other embodiments which do not depart from the spirit of this invention. The invention should therefore be limited in scope only by the attached claims.

What is claimed is:

1. A method of determining acoustic velocities of earth formations from signals generated by an array acoustic well logging instrument, comprising:

generating an initial model, said initial model including a value of velocity selected at random from within a possible range of said values for each propagation mode for which said velocities are to be determined;

synthesizing acoustic waveforms for a plurality of receiver locations on said acoustic logging instrument using said velocities in said model;

determining a difference between said synthesized waveforms and measured waveforms generated by acoustic energy detected at corresponding receiver locations by said acoustic logging instrument; and adjusting said initial model, resynthesizing said waveforms based on said adjusted initial model, and determining said difference until said difference is determined to be at a minimum, wherein said step of adjusting is performed by simulated annealing, said simulated annealing including successively limiting a perturbation range for successive ones of said adjusted models by a function related to an annealing temperature, said simulated annealing including limiting perturbation of said adjusted initial model to about two perturbations per annealing temperature.

2. The method as defined in claim 1 wherein an initial temperature of said simulated annealing is about 1.0.

3. The method as defined in claim 1 wherein said annealing temperature is reduced according to a Cauchy distribution and a decay rate for said annealing temperature is about 0.98.

4. The method as defined in claim 1 further comprising:

separating said measured waveforms into time windows each corresponding to an expected arrival time of acoustic energy propagating in a particular wave propagation mode;

synthesizing said acoustic waveforms within each of said time windows using only an acoustic velocity value corresponding to said particular wave propagation mode;

determining a difference between said synthesized waveforms and said measured waveforms within each of said time windows; and adjusting said velocity values for each of said propagation modes so as to minimize said difference within each of said windows, wherein said adjusting and minimizing is performed by simulated annealing, said simulated annealing including successively limiting a perturbation range for successive ones of said adjusted models by a function related to an annealing temperature, said simulated annealing including limiting perturbation of said model to two perturbations per annealing temperature.

5. The method as defined in claim 1 further comprising terminating said step of adjusting when said difference is less than about 0.01 between successive iterations of said step of adjusting.

* * * * *